(12) United States Patent
Hasegawa et al.

(10) Patent No.: US 9,738,319 B2
(45) Date of Patent: Aug. 22, 2017

(54) VEHICLE SIDE PORTION STRUCTURE

(71) Applicant: TOYOTA JIDOSHA KABUSHIKI KAISHA, Toyota-shi (JP)

(72) Inventors: Yasutaka Hasegawa, Toyota (JP); Kaoru Miyamoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/040,519

(22) Filed: Feb. 10, 2016

(65) Prior Publication Data

US 2016/0257345 A1    Sep. 8, 2016

(30) Foreign Application Priority Data

Mar. 3, 2015 (JP) .................................. 2015-041753

(51) Int. Cl.
*B62D 21/15* (2006.01)
*B62D 25/02* (2006.01)
*B62D 25/04* (2006.01)

(52) U.S. Cl.
CPC ........... *B62D 21/152* (2013.01); *B62D 25/02* (2013.01); *B62D 25/025* (2013.01); *B62D 25/04* (2013.01)

(58) Field of Classification Search
CPC .. B62D 21/152; B62D 21/157; B62D 25/025; B62D 25/04
USPC ...... 296/187.1, 187.12, 193.06, 198, 203.03, 296/209, 30
See application file for complete search history.

(56) References Cited

U.S. PATENT DOCUMENTS

| | | | |
|---|---|---|---|
| 6,189,952 B1* | 2/2001 | Schmidt | B62D 21/157 296/187.12 |
| 2004/0113462 A1 | 6/2004 | Winter et al. | |
| 2008/0143147 A1* | 6/2008 | Lee | B62D 27/023 296/193.06 |

(Continued)

FOREIGN PATENT DOCUMENTS

| | | |
|---|---|---|
| EP | 2 708 449 A1 | 3/2014 |
| FR | 2902399 A1 * | 12/2007 |
| JP | 406099851 A * | 4/1994 |

(Continued)

OTHER PUBLICATIONS

Machine Translation of KR-20030006713-A, printed from the KIPO website, Oct. 3, 2016.*

*Primary Examiner* — Jason S Morrow
(74) *Attorney, Agent, or Firm* — Oblon, McClelland, Maier & Neustadt, L.L.P.

(57) ABSTRACT

A vehicle side portion structure includes: a rocker disposed along a vehicle front-rear direction at a lower portion of a vehicle side portion, a cross-sectional shape of the rocker viewed in the vehicle front-rear direction being formed as a closed cross section shape; a front pillar that rises toward a vehicle upper side from a front end portion at a vehicle front side of the rocker, a cross-sectional shape of the front pillar viewed in a vehicle vertical direction being formed as a closed cross section shape; and a load-bearing rod that is inflected along the rocker and the front pillar as viewed in a vehicle width direction, one end side in a length direction of the load-bearing rod being disposed inside the rocker and joined to the rocker, and another end side in the length direction of the load-bearing rod being disposed inside the front pillar.

7 Claims, 8 Drawing Sheets

(56) References Cited

U.S. PATENT DOCUMENTS

2010/0109370 A1* 5/2010 Yamada ............ B62D 25/2018
296/70

FOREIGN PATENT DOCUMENTS

| JP | 11-342869 | | | 12/1999 |
|---|---|---|---|---|
| JP | 2004-067082 | A | | 3/2004 |
| JP | 2005161893 | A | * | 6/2005 |
| JP | 2012-111338 | | | 6/2012 |
| KR | 20030006713 | A | * | 1/2003 |
| WO | WO 2012/153425 | A1 | | 11/2012 |

* cited by examiner

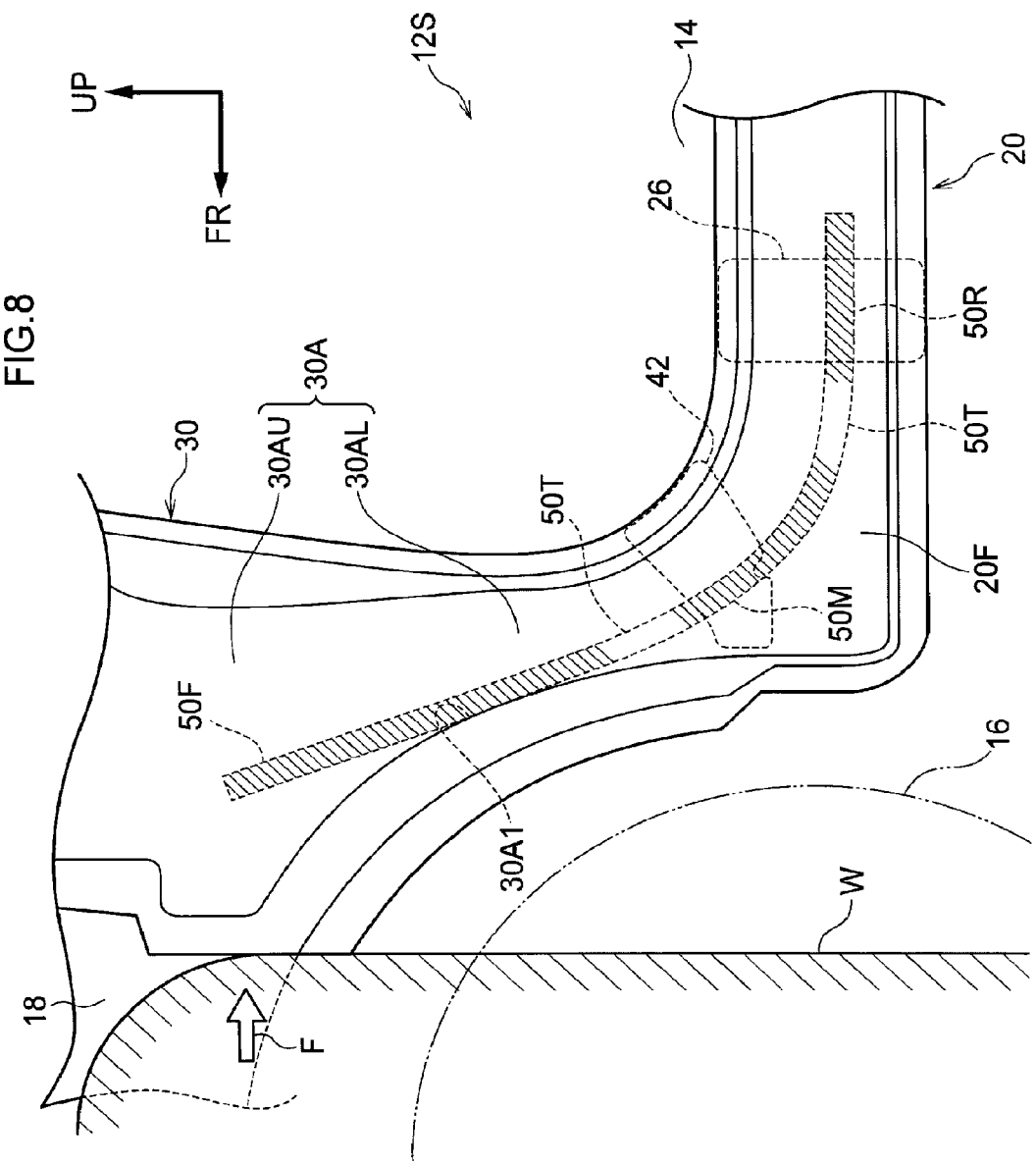

VEHICLE SIDE PORTION STRUCTURE

CROSS-REFERENCE TO RELATED APPLICATION

This application is based on and claims priority under 35 USC 119 from Japanese Patent Application No. 2015-041753 filed on Mar. 3, 2015, the disclosure of which is incorporated by reference herein.

TECHNICAL FIELD

The present invention relates to a vehicle side portion structure.

RELATED ART

There is a vehicle side portion structure (for example, see Japanese Patent Application Laid-Open (JP-A) No. 2012-111338) that is provided with a reinforcing member disposed inside a front pillar. One end portion of the reinforcing member is joined to a front wall portion of the front pillar and another end portion of the reinforcing member is joined to an upper wall portion or a lower wall portion of a rocker.

Technologies relating to reinforcement structures for rockers also include, for example, International Publication No. WO 2012/153425 and JP-A No. H11-342869.

The vehicle side portion structure mentioned above has scope for further improvement in regard to suppressing tilting of the front pillar toward a vehicle rear side in association with a vehicle frontal collision (hereinafter referred to simply as a "front impact").

SUMMARY

In consideration of the circumstances described above, an object of the present invention is to provide a vehicle side portion structure that may suppress tilting of a front pillar toward a vehicle rear side in association with a front impact.

A vehicle side portion structure according to a first aspect includes: a rocker disposed along a vehicle front-rear direction at a lower portion of a vehicle side portion, a cross-sectional shape of the rocker viewed in the vehicle front-rear direction being formed as a closed cross section shape; a front pillar that rises toward a vehicle upper side from a front end portion at a vehicle front side of the rocker, a cross-sectional shape of the front pillar viewed in a vehicle vertical direction being formed as a closed cross section shape; and a load-bearing rod that is inflected along the rocker and the front pillar as viewed in a vehicle width direction, one end side in a length direction of the load-bearing rod being disposed inside the rocker and joined to the rocker, and another end side in the length direction of the load-bearing rod being disposed inside the front pillar.

According to the structure described above, the load-bearing rod is inflected along the rocker and the front pillar as viewed from the vehicle width direction outer side. The one end side in the length direction of the load-bearing rod is disposed inside the rocker and is joined to the rocker. The another end side in the length direction of the load-bearing rod is disposed inside the front pillar.

Therefore, if a front impact load toward the vehicle rear side is input to the front pillar in association with a front impact, the front impact load is input to the another end side of the load-bearing rod. As a result, the load-bearing rod bendingly deforms toward the vehicle rear side. At this time, the front impact load input to the another end side of the load-bearing rod is transmitted, via the one end side of the load-bearing rod, to the rocker. Thus, the load-bearing rod resists the front impact load input to the another end side by bending rigidity. Therefore, tilting of the front pillar toward the vehicle rear side in association with the front impact is suppressed.

If a collision body collides with a front face of a vehicle at the outer side in the vehicle width direction relative to a front side member (hereinafter, this collision mode is referred to as a "micro-wrap collision"), the collision body may pass along at the vehicle width direction outer side of the front side member and collide with a front pillar directly or via a front wheel. The present aspect is particularly effective in regard to micro-wrap collisions. In the present aspect, a collision body colliding with the front pillar may be borne by the another end side of the load-bearing rod. Therefore, tilting of the front pillar toward the vehicle rear side in association with a micro-wrap collision may be suppressed efficiently.

Further, because the load-bearing rod inflects from the front end portion of the rocker and extends toward the vehicle upper side along the front pillar, a front impact load that is input to the front pillar may be borne by a region at the another end side of the load-bearing rod that is disposed inside the front pillar. Therefore, tilting of the front pillar toward the vehicle rear side in association with a front impact, particularly a micro-wrap collision, may be suppressed more effectively.

In a vehicle side portion structure according to a second aspect, in the vehicle side portion structure according to the first aspect, the load-bearing rod includes a tubular hollow portion.

According to the structure described above, a front impact load that is input to the another end side of the load-bearing rod in association with a front impact is transmitted to the rocker via the one end side of the load-bearing rod. If the front impact load input to the another end side of the load-bearing rod is at least a predetermined value, the hollow portion of the load-bearing rod is crushed and collision energy is absorbed. Therefore, in the present aspect, both tilting of the front pillar toward the vehicle rear side in association with a front impact may be suppressed and a front impact load that is transmitted to the rocker may be regulated.

In a vehicle side portion structure according to a third aspect, the vehicle side portion structure according to the first aspect or the second aspect further comprising a rear side bracket provided inside the rocker, the rear side bracket being disposed along the vehicle front-rear direction and the vehicle vertical direction, and the rear side bracket supporting the one end side of the load-bearing rod.

According to the structure described above, the rear side bracket is provided inside the rocker. The rear side bracket is disposed along the vehicle front-rear direction and the vehicle vertical direction, and supports the one end side of the load-bearing rod.

If the another end side of the load-bearing rod bendingly deforms toward the vehicle rear side in association with a front impact, the one end side of the load-bearing rod acts so as to turn to lift up toward the vehicle rear side, pivoting about the rear side bracket.

However, in the present aspect, the rear side bracket is disposed along the vehicle front-rear direction and the vehicle vertical direction as mentioned above. Therefore, the rear side bracket efficiently resists the above-described turning of the one end side of the load-bearing rod. Hence, because the turning of the one end side of the load-bearing rod is suppressed, a resistance force in the load-bearing rod in opposition to the front impact load is increased. Therefore, tilting of the front pillar toward the vehicle rear side in association with a front impact is further suppressed.

In a vehicle side portion structure according to a fourth aspect, in the vehicle side portion structure according to the third aspect, the one end side of the load-bearing rod extends in the vehicle front-rear direction along the rocker; and the rear side bracket includes a pair of holding wall portions that clamp the one end side of the load-bearing rod from both sides in the vehicle vertical direction.

According to the structure described above, the one end side of the load-bearing rod extends in the vehicle front-rear direction along the rocker, and the rear side bracket includes the pair of holding wall portions. Because the one end side of the load-bearing rod is clamped from both sides in the vehicle vertical direction by the pair of holding wall portions, turning of the one end side of the load-bearing rod in association with a bending deformation is further suppressed. Therefore, the resistance force in the load-bearing rod in opposition to the front impact load is increased further.

In a vehicle side portion structure according to a fifth aspect, the vehicle side portion structure according to any one of the first to fourth aspects further comprising a front side bracket provided inside the front pillar, the front side bracket being disposed along the vehicle front-rear direction and the vehicle width direction, and the another end side of the load-bearing rod penetrating the front side bracket in the vehicle vertical direction.

According to the structure described above, the front side bracket is provided inside the front pillar. The front side bracket is disposed along the vehicle front-rear direction and the vehicle width direction, and the one end side of the load-bearing rod penetrates the front side bracket in the vehicle vertical direction. Therefore, a front impact load that is input to the front pillar is efficiently transmitted through the front side bracket to the another end side of the load-bearing rod.

The front side bracket is disposed along the vehicle front-rear direction and the vehicle width direction. Crushing of the front pillar (buckling of the cross section thereof) is suppressed by the front side bracket. Consequently, a front impact load is more efficiently transmitted to the rocker via the front pillar and the load-bearing rod. Therefore, tilting of the front pillar toward the vehicle rear side in association with a front impact is further suppressed.

In a vehicle side portion structure according to a sixth aspect, the vehicle side portion structure according to any one of the first to fifth aspects further comprising a middle bracket provided: inside a lower end portion of the front pillar, inside the front end portion of the rocker, or extending along the inside of the lower end portion of the front pillar and the inside of the front end portion of the rocker, the middle bracket supporting a middle portion in the length direction of the load-bearing rod.

According to the structure described above, the middle bracket is provided to extend along the interior of the lower end portion of the front pillar, along the interior of the front end portion of the rocker, or along the interior of the lower end portion of the front pillar and the interior of the front end portion of the rocker. Because the middle portion in the length direction of the load-bearing rod is supported by this middle bracket, bending rigidity of the load-bearing rod in opposition to a front impact load is increased. Therefore, tilting of the front pillar toward the vehicle rear side in association with a front impact is further suppressed.

In a vehicle side portion structure according to a seventh aspect, the vehicle side portion structure according to any one of the first to sixth aspects further comprising an apron upper member that extends toward a vehicle front side from the front pillar, wherein the another end side of the load-bearing rod is disposed at a vehicle rear side relative to the apron upper member.

According to the structure described above, the another end side of the load-bearing rod is disposed at the vehicle rear side relative to the apron upper member that extends toward the vehicle front from the front pillar. Thus, for example, even if a vehicle (a collision object) such as a sport utility vehicle (SUV) or the like in which the location of a front bumper is higher than in an ordinary vehicle (for example, a sedan) collides with the front pillar in association with a micro-wrap collision, the colliding vehicle may be borne by the another end side of the load-bearing rod. Therefore, tilting of the front pillar toward the vehicle rear side in association with a micro-wrap collision may be suppressed more effectively.

As described above, according to the vehicle side portion structure according to the present invention, tilting of the front pillar toward the vehicle rear side in association with a front impact may be suppressed.

BRIEF DESCRIPTION OF THE DRAWINGS

Exemplary embodiments of the present invention will be described in detail based on the following figures, wherein:

FIG. 8 is a magnified side view, corresponding to FIG. 1, showing a vehicle side portion in which a variant example of the vehicle side portion structure in accordance with the exemplary embodiment is employed.

DETAILED DESCRIPTION

Figure 1:
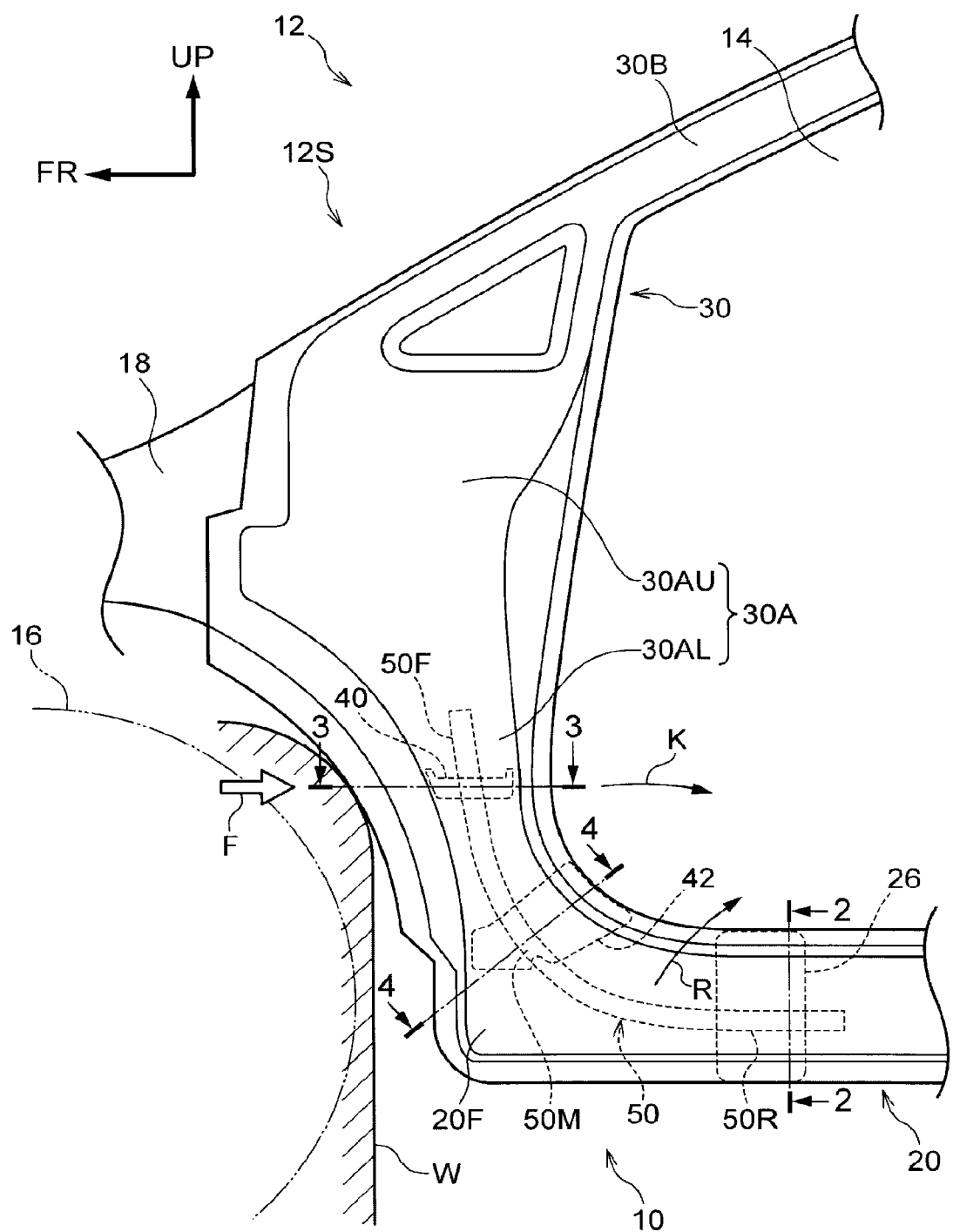
FIG. 1 is a side view, viewed from a vehicle width direction outer side, of a vehicle side portion in which a vehicle side portion structure in accordance with an exemplary embodiment is employed.

Here below, a vehicle side portion structure is described in relation to an exemplary embodiment of the present invention. The arrow FR that is shown as appropriate in the drawings indicates the vehicle front side (the front side in a vehicle front-rear direction), the arrow UP indicates the vehicle upper side (the upper side in a vehicle vertical direction), and the arrow IN indicates a vehicle width direction inner side.

FIG. 1 shows a vehicle side portion 12S of a vehicle 12 in which a vehicle side portion structure 10 according to the present exemplary embodiment is employed. In the vehicle side portion 12S, a front door opening portion 14 for a vehicle occupant to board and alight through is formed. The vehicle side portion structure 10 is provided with a rocker 20, a front pillar 30 and a load-bearing rod 50.

The rocker 20 is a framework member in a beam shape that is fabricated of metal. The rocker 20 forms a lower edge portion at the vehicle lower side of the front door opening portion 14. The rocker 20 is disposed along the vehicle front-rear direction at a lower portion of the vehicle side portion 12S. More specifically, the rocker 20 is disposed along the vehicle front-rear direction at each of two vehicle width direction sides of a vehicle body floor (a floor panel), which is not shown on the drawings. A cross-sectional shape of the rocker 20, viewed in the vehicle front-rear direction, is formed as a closed cross section shape (see FIG. 2).

The front pillar 30 is a column-shaped framework member that is fabricated of metal. The front pillar 30 forms a front edge portion at the vehicle front side of the front door opening portion 14. A cross-sectional shape of the front pillar 30 viewed in the vehicle vertical direction is formed as a closed cross section shape (see FIG. 3).

The front pillar 30 includes a front pillar lower 30A and a front pillar upper 30B. The front pillar lower 30A is disposed at each of two sides in the vehicle width direction of a dash panel, which is not shown in the drawings. Each front pillar lower 30A rises up in the vehicle vertical direction from a front end portion 20F at the vehicle front side of the rocker 20. A front side door, which is not shown in the drawings, opens and closes the front door opening portion 14. The front side door is swingably mounted at the front pillar lower 30A via a door hinge. The front pillar upper 30B is connected to an upper end portion of the front pillar lower 30A.

A front wheel 16 is disposed to the vehicle front of a lower portion 30AL of the front pillar lower 30A. An apron upper member 18 extends toward the vehicle front from an upper portion 30AU of the front pillar lower 30A.

The front pillar upper 30B extends toward the vehicle upper side and the vehicle rear from the upper end portion of the front pillar lower 30A. The front pillar upper 30B extends along a vehicle width direction outer side end portion of a windshield glass (a front glass), which is not shown in the drawings. A roof side rail, which is not shown in the drawings, extends toward the vehicle rear from an upper end portion of the front pillar upper 30B.

The load-bearing rod 50 is disposed inside the rocker 20 (inside the closed cross section thereof) and the interior of the front pillar lower 30A (inside the closed cross section thereof). The load-bearing rod 50 is a rod-shaped reinforcing member that transmits a front impact load (a collision load) F that is input to the front pillar 30 in association with a front impact to the rocker 20. Specifically, the load-bearing rod 50 is a pipe member fabricated of metal that is formed in a tubular shape. The load-bearing rod 50 includes a hollow portion 50V that extends over the whole length in a length direction thereof (see FIG. 2).

The load-bearing rod 50 is inflected in an "L" shape along the rocker 20 and the front pillar 30 as viewed in the vehicle width direction. A rod rear portion 50R at one end side in the length direction (the vehicle rear side) of the load-bearing rod 50 is disposed inside a front portion of the rocker 20. The rod rear portion 50R extends linearly in the vehicle front-rear direction along the rocker 20 and is joined to the rocker 20 via a rear side bracket 26.

Figure 2:
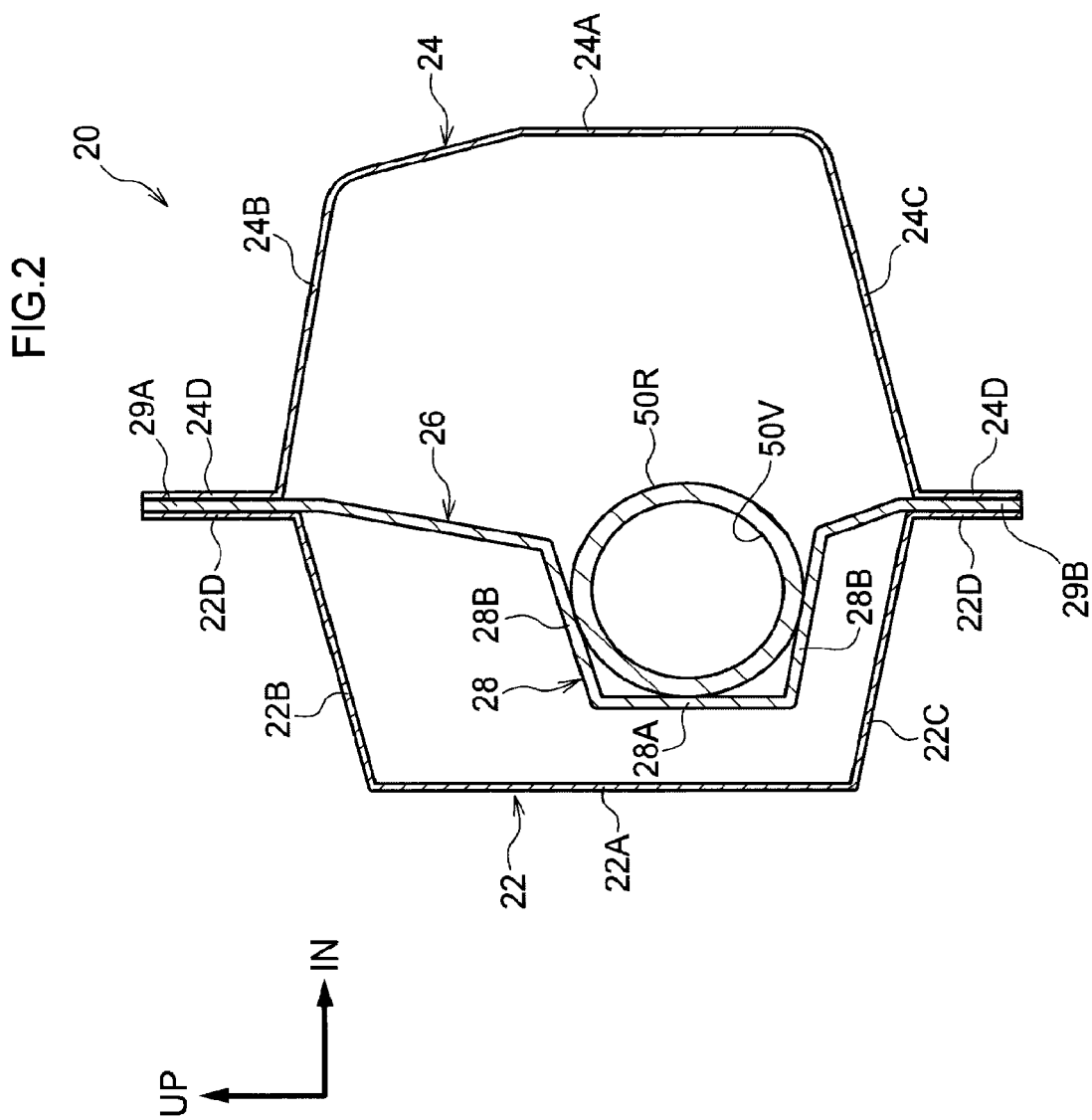
FIG. 2 is a magnified sectional diagram cut along line 2-2 in FIG. 1.

Specifically, as shown in FIG. 2, the rocker 20 is divided in the vehicle width direction, including a rocker outer panel 22 and a rocker inner panel 24. The rocker outer panel 22 is a panel member that forms a portion at the vehicle width direction outer side of the rocker 20. A cross-sectional shape of the rocker outer panel 22 viewed in the vehicle front-rear direction is formed in a hat shape, the vehicle width direction inner side of which is open. The rocker outer panel 22 includes an outer side wall portion 22A, an upper wall portion 22B, a lower wall portion 22C, and upper and lower flange portions 22D.

The rocker inner panel 24 is a panel member that forms a portion at the vehicle width direction inner side of the rocker 20. The rocker inner panel 24 is disposed at the vehicle width direction inner side of the rocker outer panel 22. A cross-sectional shape of the rocker inner panel 24 viewed in the vehicle front-rear direction is formed in a hat shape, the vehicle width direction outer side of which is open. The rocker inner panel 24 includes an inner side wall portion 24A, an upper wall portion 24B, a lower wall portion 24C, and upper and lower flange portions 24D.

The rocker outer panel 22 and the rocker inner panel 24 are joined together by joining means such as welding or the like in a state in which the respective upper and lower flange portions 22D and 24D thereof are superposed. A closed cross section is formed by the rocker outer panel 22 and the rocker inner panel 24.

The rear side bracket 26 is a panel member fabricated of metal that is disposed along the vehicle front-rear direction and the vehicle vertical direction. A cross-sectional shape of the rear side bracket 26 viewed in the vehicle front-rear direction is formed in a hat shape, the vehicle width direction inner side of which is open. The rear side bracket 26 includes an accommodation recess portion 28, an upper side flange portion 29A and a lower side flange portion 29B.

The accommodation recess portion 28 is recessed to the vehicle width direction outer side relative to the upper side flange portion 29A and the lower side flange portion 29B. The accommodation recess portion 28 is a recess portion that extends in the vehicle front-rear direction along the rocker 20. The rod rear portion 50R is fitted into the interior of the accommodation recess portion 28.

The accommodation recess portion 28 includes a bottom wall portion 28A and a pair of holding wall portions 28B. The bottom wall portion 28A is disposed at the vehicle width direction outer side of the rod rear portion 50R and is joined to the rod rear portion 50R by welding or the like. The pair of holding wall portions 28B are disposed at both sides in the vehicle vertical direction of the rod rear portion 50R and are joined to the rod rear portion 50R by welding or the like. Because the rod rear portion 50R is clamped from both sides in the vehicle vertical direction by the pair of holding wall portions 28B, displacement of the rod rear portion 50R in the vehicle vertical direction is restrained.

The upper side flange portion 29A extends toward the vehicle upper side from a vehicle width direction inner side end portion of the holding wall portion 28B that is at the upper side. In a state in which the upper side flange portion 29A is sandwiched between the flange portions 22D and 24D at the upper sides of the rocker outer panel 22 and rocker inner panel 24, the upper side flange portion 29A is joined to these flange portions 22D and 24D by welding or the like.

The lower side flange portion 29B extends toward the vehicle lower side from a vehicle width direction inner side end portion of the holding wall portion 28B that is at the lower side. In a state in which the lower side flange portion 29B is sandwiched between the flange portions 22D and 24D at the lower sides of the rocker outer panel 22 and rocker inner panel 24, the lower side flange portion 29B is joined to these flange portions 22D and 24D by welding or the like.

As shown in FIG. 1, a rod front portion 50F at another end side in the length direction (the vehicle front side) of the load-bearing rod 50 is disposed inside the front pillar lower 30A. The rod front portion 50F extends linearly along the lower portion 30AL of the front pillar lower 30A in the vehicle vertical direction, and is joined to the lower portion 30AL via a front side bracket 40.

Figure 3:
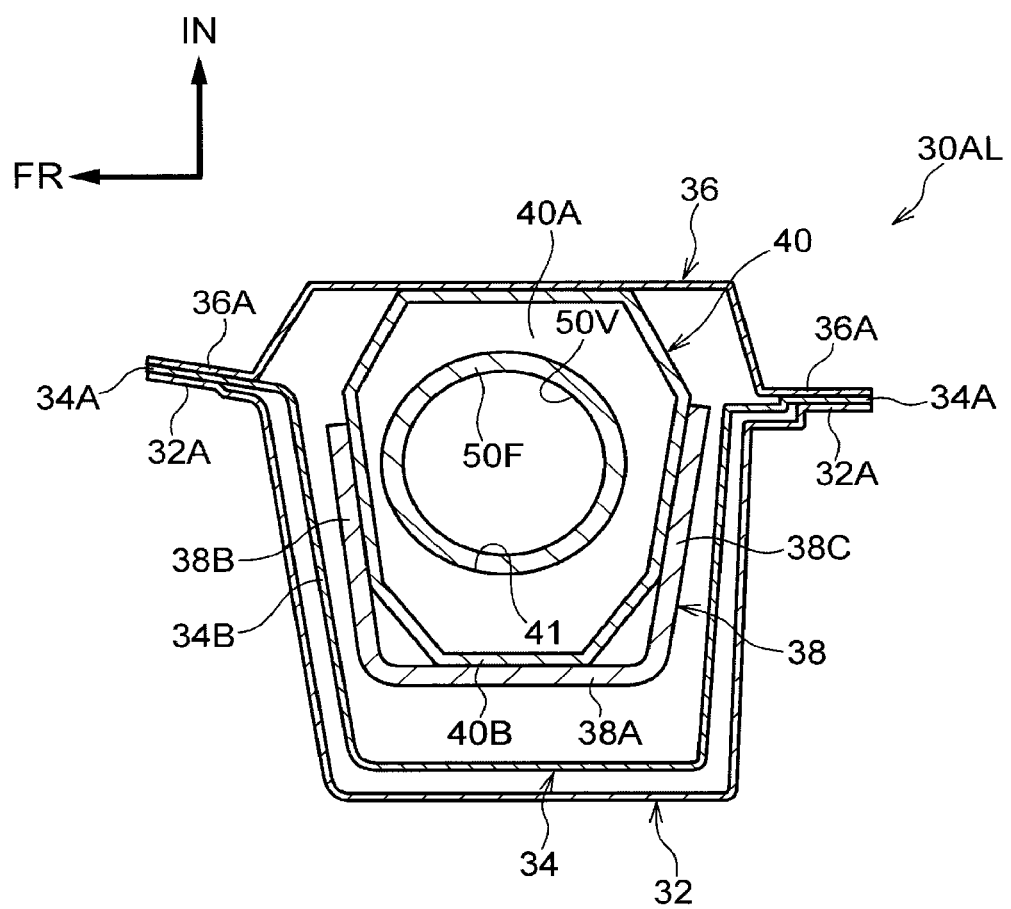
FIG. 3 is a magnified sectional diagram cut along line 3-3 in FIG. 1.

Specifically, as shown in FIG. 3, the front pillar lower 30A includes a pillar outer panel 32, a pillar outer reinforcement 34, a pillar inner panel 36 and a hinge reinforcement 38.

The pillar outer panel 32 is disposed at the vehicle width direction outer side of the pillar outer reinforcement 34. The pillar outer panel 32 and the pillar outer reinforcement 34 are joined to one another, forming a panel member that forms a portion at the vehicle width direction outer side of the front pillar lower 30A (a front pillar outer portion). Cross-sectional shapes of the pillar outer panel 32 and the pillar outer reinforcement 34 viewed in the vehicle vertical direction are formed in hat shapes, vehicle width direction inner sides of which are open.

The pillar inner panel 36 is a panel member that forms a portion at the vehicle width direction inner side of the front pillar lower 30A. A cross-sectional shape of the pillar inner panel 36 viewed in the vehicle vertical direction is formed in a hat shape, the vehicle width direction outer side of which is open. The pillar outer panel 32, pillar outer reinforcement 34 and pillar inner panel 36 are joined by welding or the like in a state in which respective front and rear flange portions 32A, 34A and 36A thereof are superposed. As a result, a closed cross section is formed by the pillar outer panel 32 and the pillar outer reinforcement 34, and a closed cross section is formed by the pillar outer reinforcement 34 and the pillar inner panel 36.

The hinge reinforcement 38 is disposed between the pillar outer reinforcement 34 and the pillar inner panel 36. A cross-sectional shape of the hinge reinforcement 38 viewed in the vehicle vertical direction is formed in a "U" shape, the vehicle width direction inner side of which is open. The hinge reinforcement 38 includes an outer side wall portion 38A, a front wall portion 38B and a rear wall portion 38C. The outer side wall portion 38A is joined by welding or the like to both a door hinge, which is not shown in the drawings, and the pillar outer reinforcement 34. The front side bracket 40 is disposed inside the hinge reinforcement 38.

The front side bracket 40 is disposed along the vehicle front-rear direction and the vehicle width direction. The front side bracket 40 serves as a bulkhead that is fitted in at the interior of the hinge reinforcement 38. The front side bracket 40 includes a partition wall portion 40A and a flange portion 40B. The partition wall portion 40A is formed in a plate shape that extends in the vehicle front-rear direction and the vehicle width direction. The partition wall portion 40A is disposed with a thickness direction thereof in the length direction of the front pillar lower 30A (the vehicle vertical direction). The partition wall portion 40A partitions the interior of the front pillar lower 30A, more specifically the interior of the hinge reinforcement 38, into plural sections (compartments) in the length direction.

A mounting hole 41 is formed at a central portion of the partition wall portion 40A. The mounting hole 41 penetrates the partition wall portion 40A in the thickness direction thereof (the vehicle vertical direction). The mounting hole 41 is formed as a circular hole whose diameter is slightly larger than a diameter of the rod front portion 50F of the load-bearing rod 50. The rod front portion 50F penetrates (is fitted into) the mounting hole 41 in the vehicle vertical direction. An outer periphery portion of the rod front portion 50F is joined to the partition wall portion 40A by welding or the like.

The flange portion 40B rises up from an outer periphery portion of the partition wall portion 40A. The flange portion 40B is joined to the outer side wall portion 38A, front wall portion 38B and rear wall portion 38C of the hinge reinforcement 38 by welding or the like. Therefore, a front impact load F that is input to the front pillar lower 30A in association with a front impact (see FIG. 1) is transmitted to the rod front portion 50F via the front side bracket 40.

A rod middle portion 50M at a middle portion in the length direction of the load-bearing rod 50 is formed as an inflected portion that is inflected to extend along the front end portion 20F of the rocker 20 and the lower portion 30AL of the front pillar lower 30A. The rod middle portion 50M is joined to the lower end portion of the front pillar lower 30A via a middle bracket 42.

Figure 4:
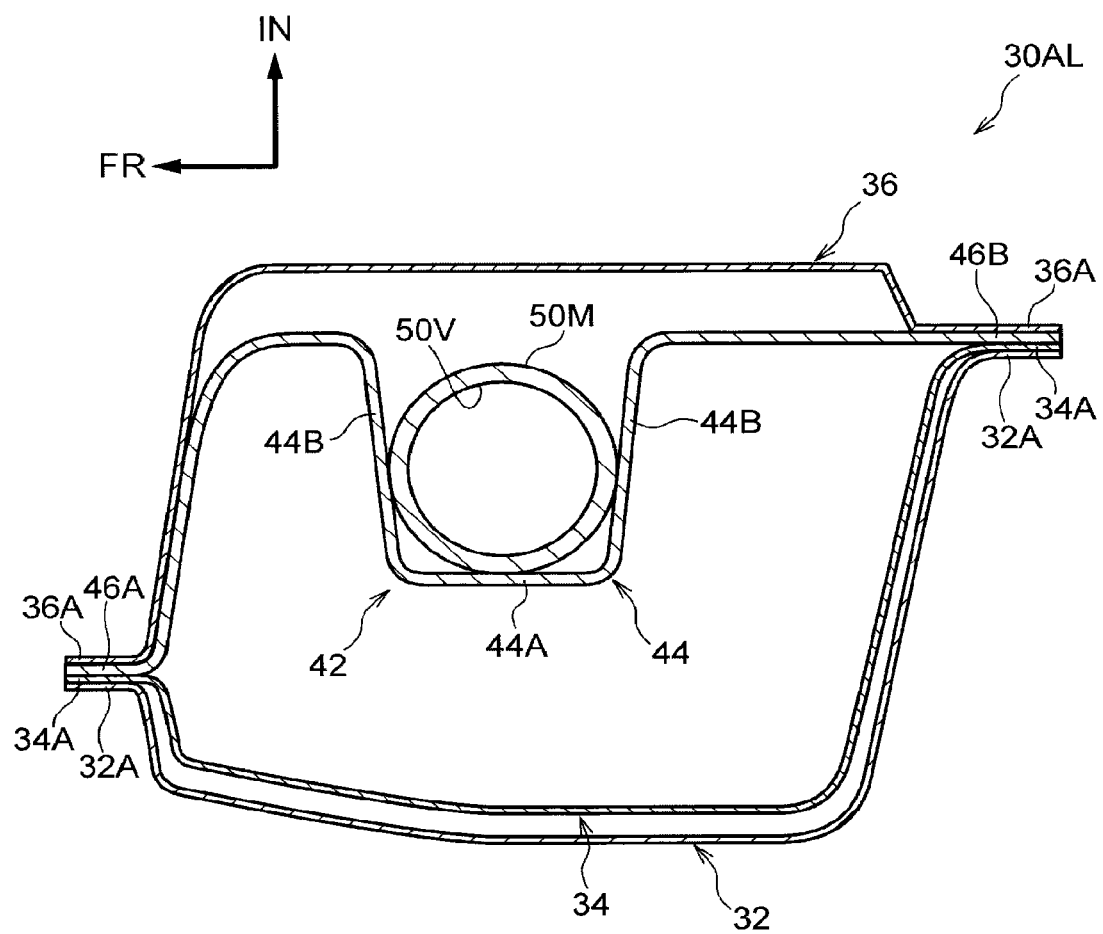
FIG. 4 is a magnified sectional diagram cut along line 4-4 in FIG. 1.

Specifically, as shown in FIG. 4, the middle bracket 42 is disposed along the vehicle front-rear direction and the vehicle vertical direction inside the lower end portion of the front pillar lower 30A. A cross-sectional shape of the middle bracket 42 viewed in the axial direction of the rod middle portion 50M is formed in a hat shape, the vehicle width direction inner side of which is open. The middle bracket 42 includes an accommodation recess portion 44, a front side flange portion 46A and a rear side flange portion 46B.

The accommodation recess portion 44 is recessed to the vehicle width direction outer side relative to the front side flange portion 46A and the rear side flange portion 46B. The accommodation recess portion 44 is a recess portion, into the interior of which the rod middle portion 50M fits. The accommodation recess portion 44 includes a bottom wall portion 44A and a pair of holding wall portions 44B.

The bottom wall portion 44A is disposed at the vehicle width direction outer side of the rod middle portion 50M and is joined to the rod middle portion 50M by welding or the like. The pair of holding wall portions 44B are disposed at both sides in the vehicle front-rear direction of the rod middle portion 50M and are joined to the rod middle portion 50M by welding or the like. Because the rod middle portion 50M is clamped from both sides in the vehicle front-rear direction by the pair of holding wall portions 44B, displacement of the rod middle portion 50M in the vehicle front-rear direction is restrained.

The front side flange portion 46A extends toward the vehicle front from a vehicle width direction inner side end portion of the holding wall portion 44B that is at the front side. In a state in which the front side flange portion 46A is sandwiched between the flange portions 34A and 36A at the front sides of the pillar outer reinforcement 34 and pillar inner panel 36, the front side flange portion 46A is joined to these flange portions 34A and 36A by welding or the like.

The rear side flange portion 46B extends toward the vehicle rear from a vehicle width direction inner side end portion of the holding wall portion 44B that is at the rear side. In a state in which the rear side flange portion 46B is sandwiched between the flange portions 34A and 36A at the rear sides of the pillar outer reinforcement 34 and pillar inner panel 36, the rear side flange portion 46B is joined to these flange portions 34A and 36A by welding or the like.

Now, operation of the present exemplary embodiment is described.

As shown in FIG. 1, according to the vehicle side portion structure 10 according to the present exemplary embodiment, the load-bearing rod 50 is inflected in the "L" shape along the rocker 20 and the front pillar 30 as viewed from the vehicle width direction outer side. The rod rear portion 50R of the load-bearing rod 50 is disposed inside the rocker 20 and is joined to the rocker 20 via the rear side bracket 26.

The rod front portion 50F of the load-bearing rod 50 is disposed inside the lower portion 30AL of the front pillar lower 30A and is joined to the lower portion 30AL via the front side bracket 40. The rod middle portion 50M of the load-bearing rod 50 is disposed inside the lower end portion of the front pillar lower 30A and is joined to this lower end portion via the middle bracket 42.

Thus, if, in association with a micro-wrap collision, a collision object W collides with the front pillar lower 30A directly or via the front wheel 16, a front impact load F toward the vehicle rear is input to the front pillar 30. The front impact load F is input to the rod front portion 50F of the load-bearing rod 50 via the front side bracket 40. As a result, the rod front portion 50F of the load-bearing rod 50 bendingly deforms toward the vehicle rear (in the direction of arrow K), pivoting about the middle bracket 42. At this time, the front impact load F is transmitted via the rod rear portion 50R to the rocker 20. Thus, the load-bearing rod 50 resists the front impact load F in accordance with a bending rigidity thereof. Therefore, tilting of the front pillar 30 toward the vehicle rear in association with the micro-wrap collision is suppressed.

Thus, in the present exemplary embodiment, tilting of the front pillar 30 toward the vehicle rear in association with a micro-wrap collision may be suppressed efficiently, by a front impact load F associated with the micro-wrap collision being borne by the rod front portion 50F of the load-bearing rod 50.

Further, because the load-bearing rod 50 inflects from the front end portion 20F of the rocker 20 and extends toward the vehicle upper side along the front pillar lower 30A, a front impact load F that is input to the front pillar lower 30A may be borne by a region extending along the load-bearing rod 50 from the rod middle portion 50M to the rod front portion 50F. Therefore, tilting of the front pillar 30 toward the vehicle rear in association with a micro-wrap collision may be suppressed more effectively.

The rod front portion 50F is joined to the front pillar lower 30A via the front side bracket 40. The front side bracket 40 includes the partition wall portion 40A that extends in the vehicle front-rear direction and the vehicle width direction. Therefore, a front impact load F that is input to the front pillar 30 is efficiently transmitted to the rod front portion 50F via the partition wall portion 40A.

The cross-sectional shape of the front pillar lower 30A is maintained by the partition wall portion 40A. Therefore, crushing (buckling of the cross section) of the front pillar lower 30A is suppressed. As a result, a front impact load F is more efficiently transmitted to the rocker 20 via the front pillar lower 30A and the load-bearing rod 50.

The rod middle portion 50M is joined to the lower end portion of the front pillar lower 30A via the middle bracket 42. Thus, because the middle bracket 42 supports the rod middle portion 50M, bending rigidity of the load-bearing rod 50 against a front impact load F is increased.

The rod rear portion 50R is joined to the rocker 20 via the rear side bracket 26. The rear side bracket 26 is disposed along the vehicle front-rear direction and the vehicle vertical direction.

When a front impact load F is applied to the rod front portion 50F of the load-bearing rod 50, the load-bearing rod 50 bendingly deforms toward the vehicle rear and the rod rear portion 50R acts to turn so as to lift up toward the vehicle rear, pivoting about the rear side bracket 26 (the direction of arrow R in FIG. 1). However, in the present exemplary embodiment, as mentioned above, the cross-sectional shape of the rear side bracket 26 viewed in the vehicle front-rear direction is formed in a hat shape of which the vehicle width direction inner side is open, and the rear side bracket 26 is disposed along the vehicle front-rear direction and the vehicle vertical direction. The rod rear portion 50R is fitted into the interior of the accommodation recess portion 28 of the rear side bracket 26. The upper side flange portion 29A of the rear side bracket 26 has been joined to the flange portions 22D and 24D at the upper sides of the rocker outer panel 22 and the rocker inner panel 24 in the state in which the upper side flange portion 29A is sandwiched between these flange portions 22D and 24D, and the lower side flange portion 29B of the rear side bracket 26 has been joined to the flange portions 22D and 24D at the lower sides of the rocker outer panel 22 and the rocker inner panel 24 in the state in which the lower side flange portion 29B is sandwiched between the flange portions 22D and 24D. Therefore, when the rod rear portion 50R acts to turn as described above, the load is efficiently transmitted through the rear side bracket 26 to the rocker 20. As a result, turning of the rod rear portion 50R is suppressed.

The rear side bracket 26 includes the pair of holding wall portions 28B. Because the rod rear portion 50R is clamped from both sides in the vehicle vertical direction by the pair of holding wall portions 28B, turning of the rod rear portion 50R is further suppressed. Therefore, tilting of the front pillar 30 toward the vehicle rear in association with a front impact is further suppressed.

The load-bearing rod 50 includes the hollow portion 50V that extends over the whole length direction length thereof. Therefore, for example, if a front impact load F input to the rod front portion 50F of the load-bearing rod 50 is at least a predetermined value, the hollow portion 50V of the load-bearing rod 50 is crushed and absorbs collision energy. Therefore, both tilting of the front pillar 30 toward the vehicle rear in association with a front impact may be suppressed and the front impact load that is transmitted to the rocker 20 may be regulated.

Now, variant examples of the present exemplary embodiment are described.

In the above exemplary embodiment, the cross-sectional shapes of the rear side bracket 26 and the middle bracket 42 viewed in the vehicle front-rear direction are hat shapes of which the vehicle width direction inner sides are open, but the above exemplary embodiment is not limited thus. The cross-sectional shapes of the rear side bracket 26 and the middle bracket 42 viewed in the vehicle front-rear direction may, for example, be formed in hat shapes of which the vehicle width direction outer sides are open. Further, the rear side bracket 26 may be formed as, for example, a bulkhead that is disposed along the vehicle width direction and the vehicle vertical direction inside the rocker 20, and the middle bracket 42 may be formed as a bulkhead similar to the front side bracket 40.

In the exemplary embodiment described above, the middle bracket 42 is provided inside the lower end portion of the front pillar lower 30A, but the above exemplary embodiment is not limited thus. For example, the middle bracket 42 may be provided inside the front end portion 20F of the rocker 20, or the middle bracket 42 may be provided to extend along the interior of the lower end portion of the front pillar lower 30A and the interior of the front end portion 20F of the rocker 20.

In the above exemplary embodiment, the front side bracket 40 is fitted into the interior of the hinge reinforcement 38. However, the front side bracket may, for example, be fitted into the closed cross section that is formed by the pillar outer reinforcement 34 and the pillar inner panel 36.

The front side bracket 40 may be formed by two components that are divided in the vehicle front-rear direction or the vehicle width direction. In this case, it is easier to assemble the front side bracket 40 to the front pillar lower 30A. In the above exemplary embodiment, the front side bracket 40 is formed as a bulkhead. However, the front side bracket 40 may be formed as, for example, a bracket that is disposed along the vehicle front-rear direction and the vehicle vertical direction similarly to the middle bracket 42.

In the above exemplary embodiment, the rod front portion 50F, the rod middle portion 50M and the rod rear portion 50R of the load-bearing rod 50 are supported by, respectively, the front side bracket 40, the middle bracket 42 and the rear side bracket 26, but the above exemplary embodiment is not limited thus. In the above exemplary embodiment, one or both of the front side bracket 40 and the middle bracket 42 may be omitted.

Figure 5:
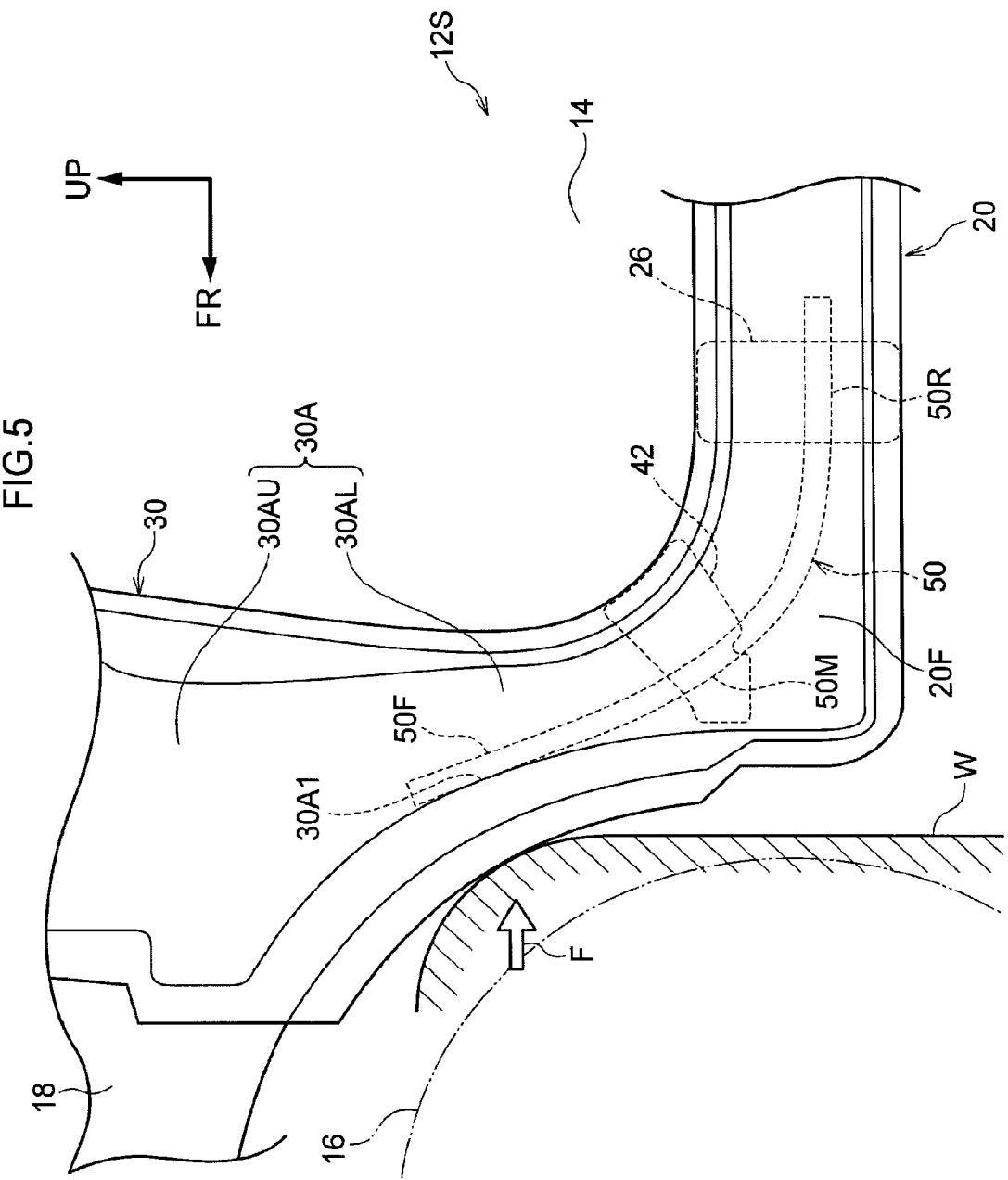
FIG. 5 is a magnified side view, corresponding to FIG. 1, showing a vehicle side portion in which a variant example of the vehicle side portion structure in accordance with the exemplary embodiment is employed.

For example, in the variant example illustrated in FIG. 5, the front side bracket 40 that supports the rod front portion 50F is omitted. In this variant example, the rod front portion 50F of the load-bearing rod 50 is in contact with a front wall portion 30A1 at the vehicle front side of the front pillar lower 30A. A front impact load F that that is input to the front pillar lower 30A is borne by this rod front portion 50F. Therefore, crushing of the front wall portion 30A1 of the front pillar lower 30A is suppressed. The front wall portion 30A1 of the front pillar lower 30A is formed by, for example, a front wall portion 34B at the vehicle front side of the pillar outer reinforcement 34 (see FIG. 3).

Further, the load-bearing rod 50 may be directly joined to the front pillar lower 30A and the rocker 20 without the front side bracket 40, the middle bracket 42 and the rear side bracket 26 being interposed.

Figure 6:
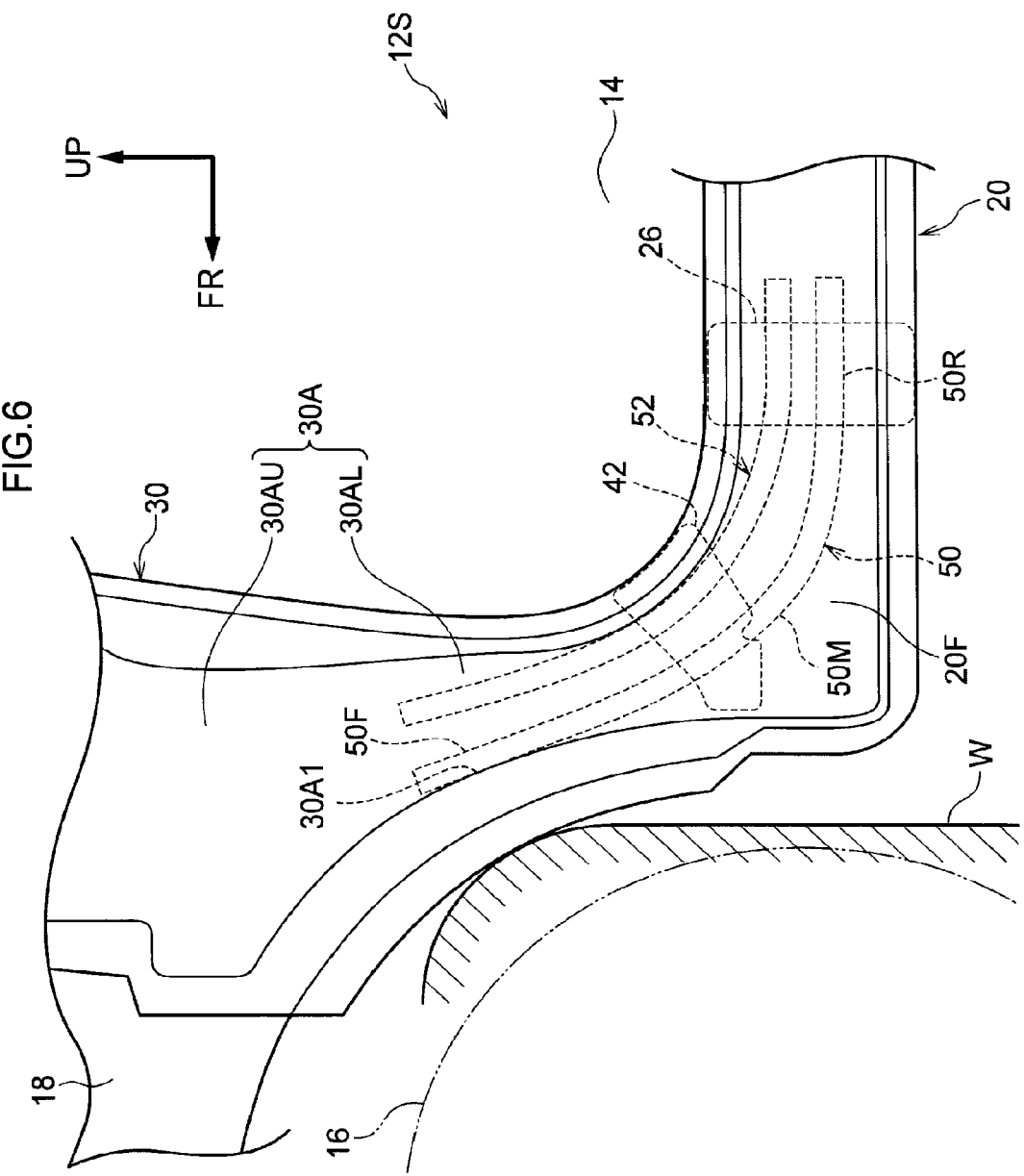
FIG. 6 is a magnified side view, corresponding to FIG. 1, showing a vehicle side portion in which a variant example of the vehicle side portion structure in accordance with the exemplary embodiment is employed.

In the above exemplary embodiment, the single load-bearing rod 50 is provided inside the rocker 20 and the interior of the front pillar lower 30A, but the above exemplary embodiment is not limited thus. For example, in a variant example illustrated in FIG. 6, two load-bearing rods 50 and 52 are provided in the interiors of the rocker 20 and the front pillar lower 30A. A rigidity of the front pillar lower 30A in the vehicle front-rear direction may be increased by providing these plural load-bearing rods 50 and 52 inside the rocker 20 and the front pillar lower 30A. Therefore, tilting of the front pillar 30 toward the vehicle rear in association with a front impact is further suppressed.

Figure 7:
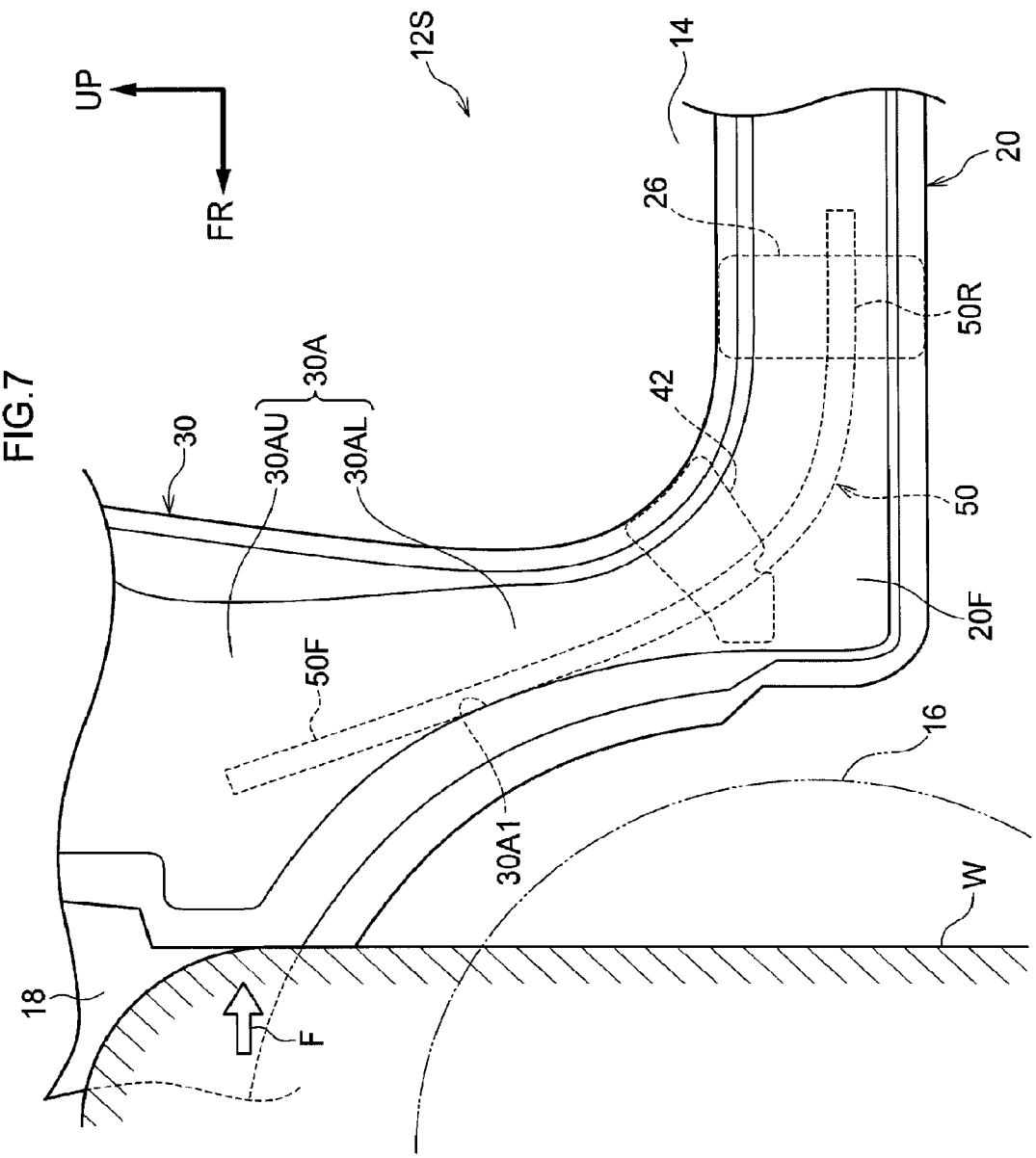
FIG. 7 is a magnified side view, corresponding to FIG. 1, showing a vehicle side portion in which a variant example of the vehicle side portion structure in accordance with the exemplary embodiment is employed.

In the above exemplary embodiment, the rod front portion 50F of the load-bearing rod 50 is disposed inside the lower portion 30AL of the front pillar lower 30A, but the above exemplary embodiment is not limited thus. For example, as in the variant example illustrated in FIG. 7, the rod front portion 50F of the load-bearing rod 50 may be disposed inside the upper portion 30AU of the front pillar lower 30A.

To be specific, the rod front portion 50F extends from the front end portion 20F of the rocker 20 through the front pillar lower 30A to the upper portion 30AU of the front pillar lower 30A. This rod front portion 50F is disposed at the vehicle rear relative to the apron upper member 18, and the rod front portion 50F is in contact with the front wall portion 30A1 of the front pillar lower 30A. In the present variant example, the front side bracket 40 that supports the rod front portion 50F (see FIG. 1) is omitted.

If the vehicle 12 has a micro-wrap collision with a collision object W such as an SUV, a minivan or a box-shape vehicle in which the location of a front bumper is higher than in an ordinary vehicle (for example, a sedan), the collision object W may collide with the upper portion 30AU of the front pillar lower 30A.

However, in the present variant example, even if a collision object W collides with the upper portion 30AU of the front pillar lower 30A, the collision object W may be borne by the rod front portion 50F of the load-bearing rod 50. Therefore, tilting of the front pillar 30 toward the vehicle rear in association with a micro-wrap collision may be suppressed more effectively.

If there is a full-wrap collision or an offset collision, a front impact load F may be input through the apron upper member 18 to the upper portion 30AU of the front pillar lower 30A. The present variant example is effective in regard to such a full-wrap collision or offset collision.

In a variant example illustrated in FIG. 8, two weakened portions 50T are provided in the load-bearing rod 50. To be specific, the two weakened portions 50T are provided in portions of the load-bearing rod 50 at both of the vehicle front-rear direction sides of the middle bracket 42.

In the present variant example, the two weakened portions 50T are formed as follows. Portions of the load-bearing rod 50 other than the two weakened portions 50T (the shaded portions in FIG. 8) are increased in strength (for example, bending strength) relative to the two weakened portions 50T by a heat treatment such as quenching or the like. Accordingly, portions of the load-bearing rod 50 with relatively low strength (the portions that are not the shaded portions) serve as the two weakened portions 50T.

If, for example, a front impact load F input to the rod front portion 50F of the load-bearing rod 50 in association with a front impact is at least a predetermined value, the load-bearing rod 50 bendingly deflects, starting from one or both of the two weakened portions 50T. Collision energy is absorbed in accordance with this bending deflection of the load-bearing rod 50. Therefore, tilting of the front pillar 30 toward the vehicle rear in association with a front impact is further suppressed.

In the present variant example, two of the weakened portions 50T are formed by the application of a heat treatment to predetermined portions of the load-bearing rod 50, but the present variant example is not limited thus. Weakened portions may be, for example, portions of the load-bearing rod 50 at which penetrating holes, incisions or the like are formed. Moreover, the number and arrangement of weakened portions provided in the load-bearing rod 50 may be suitably modified.

In the above exemplary embodiment, the load-bearing rod 50 includes the hollow portion 50V that extends over the whole length direction length thereof, but the above exemplary embodiment is not limited thus. For example, a metal material, a resin material or the like may be partially filled into the load-bearing rod 50, in which case the hollow portion 50V is formed partially in the load-bearing rod 50. Further, the load-bearing rod 50 is not limited to a pipe member but may be formed by a solid rod-shaped member.

Holes for noise reduction (noise reduction holes) may be formed in an outer periphery surface of the load-bearing rod 50. Specifically, if holes are formed in the outer periphery surface of the load-bearing rod 50, a phase difference is produced between reflected waves of sound that are reflected by the outer periphery surface of the load-bearing rod 50 and reflected waves of sound that pass through the holes and are reflected by an inner periphery surface of the load-bearing rod 50. In this case, for sound of a particular frequency, the reflected waves of sound reflected by the outer periphery surface of the load-bearing rod 50 and the reflected waves of sound reflected by the inner periphery surface of the load-bearing rod 50 are in antiphase. The two reflected waves that are in antiphase are superposed with one another and cancel each other out, thus reducing noise. Therefore, noise of a particular frequency or the like may be reduced by the formation of holes for noise reduction in the outer periphery surface of the load-bearing rod 50. The holes for noise reduction may also function as holes to be used as the weakened portions described above.

The exemplary embodiment described above is effective not just in regard to micro-wrap collisions but also in regard to various front impacts in which a front impact load is input to the front pillar 30, such as a full-wrap collision, an offset collision or the like.

Hereinabove, the present invention has been described in accordance with the exemplary embodiment, but the present invention is not limited by this exemplary embodiment. The exemplary embodiment and the various variant examples may be used in suitable combinations, and it will be clear that numerous modes may be embodied within a technical scope not departing from the gist of the present invention.

What is claimed is:

1. A vehicle side portion structure, comprising:
   a rocker disposed along a vehicle front-rear direction at a lower portion of a vehicle side portion, a cross-sectional shape of the rocker viewed in the vehicle front-rear direction being formed as a closed cross section shape;
   a front pillar that rises toward a vehicle upper side from a front end portion at a vehicle front side of the rocker, a cross-sectional shape of the front pillar viewed in a vehicle vertical direction being formed as a closed cross section shape;
   a load-bearing rod that is inflected along the rocker and the front pillar as viewed in a vehicle width direction, one end side in a length direction of the load-bearing rod being disposed inside the rocker and joined to the rocker, and another end side in the length direction of the load-bearing rod being disposed inside the front pillar; and
   a rear side bracket provided inside the rocker, the rear side bracket including a pair of holding wall portions that clamp the one end side of the load-bearing rod respectively from both sides in the vehicle vertical direction, and a bottom side holding wall portion disposed at the vehicle width direction outer side with respect to the pair of holding wall portions.

2. The vehicle side portion structure according to claim 1, wherein the load-bearing rod comprises a tubular hollow portion.

3. The vehicle side portion structure according to claim 1, wherein the rear side bracket is disposed along the vehicle front-rear direction and the vehicle vertical direction, and the rear side bracket supporting the one end side of the load-bearing rod.

4. The vehicle side portion structure according to claim 3, wherein:
   the one end side of the load-bearing rod extends in the vehicle front-rear direction along the rocker.

5. A vehicle side portion structure, comprising:
   a rocker disposed along a vehicle front-rear direction at a lower portion of a vehicle side portion, a cross-sectional shape of the rocker viewed in the vehicle front-rear direction being formed as a closed cross section shape;
   a front pillar that rises toward a vehicle upper side from a front end portion at a vehicle front side of the rocker, a cross-sectional shape of the front pillar viewed in a vehicle vertical direction being formed as a closed cross section shape;
   a load-bearing rod that is inflected along the rocker and the front pillar as viewed in a vehicle width direction, one end side in a length direction of the load-bearing rod being disposed inside the rocker and joined to the rocker, and another end side in the length direction of the load-bearing rod being disposed inside the front pillar; and
   a front side bracket provided inside the front pillar, the front side bracket being disposed along the vehicle front-rear direction and the vehicle width direction, and the another end side of the load-bearing rod penetrating the front side bracket in the vehicle vertical direction.

6. A vehicle side portion structure, comprising:
   a rocker disposed along a vehicle front-rear direction at a lower portion of a vehicle side portion, a cross-sectional shape of the rocker viewed in the vehicle front-rear direction being formed as a closed cross section shape;
   a front pillar that rises toward a vehicle upper side from a front end portion at a vehicle front side of the rocker, a cross-sectional shape of the front pillar viewed in a vehicle vertical direction being formed as a closed cross section shape;
   a load-bearing rod that is inflected along the rocker and the front pillar as viewed in a vehicle width direction, one end side in a length direction of the load-bearing rod being disposed inside the rocker and joined to the rocker, and another end side in the length direction of the load-bearing rod being disposed inside the front pillar; and
   a middle bracket provided:
   inside a lower end portion of the front pillar,
   inside a front end portion of the rocker, or
   extending along the inside of the lower end portion of the front pillar and the inside of the front end portion of the rocker,
   the middle bracket supporting a middle portion in the length direction of the load-bearing rod,
   wherein two weakened portions are provided in portions of the load-bearing rod at both of the vehicle front-rear direction sides of the middle bracket.

7. The vehicle side portion structure according to claim 1, further comprising an apron upper member that extends toward a vehicle front side from the front pillar, wherein the another end side of the load-bearing rod is disposed at a vehicle rear side relative to the apron upper member.

* * * * *